United States Patent [19]

Becker et al.

[11] Patent Number: 4,875,382
[45] Date of Patent: Oct. 24, 1989

[54] STEPPING DRIVE

[75] Inventors: Anton Becker, Aachen, Fed. Rep. of Germany; Felix Kramer, Friedlisberg, Switzerland

[73] Assignee: Elpatronic AG, Zug, Switzerland

[21] Appl. No.: 152,074

[22] Filed: Feb. 4, 1988

[30] Foreign Application Priority Data

Mar. 20, 1987 [CH] Switzerland ............. 01074/87

[51] Int. Cl.[4] .............. F16H 27/04; F16D 43/20
[52] U.S. Cl. .................. 74/84 R; 192/56 R; 192/67 R; 192/89 R
[58] Field of Search ............. 74/84 R; 192/56 R; 464/38, 39

[56] References Cited

U.S. PATENT DOCUMENTS

| | | | |
|---|---|---|---|
| 3,191,683 | 6/1965 | Alexander | 192/56 R X |
| 3,456,529 | 7/1969 | Petroff | 74/84 R X |
| 4,452,093 | 6/1984 | Rudolph | 74/84 R |

FOREIGN PATENT DOCUMENTS 709517  5/1931  France ............. 192/56 R

OTHER PUBLICATIONS

Catalogue No. 7/82, Ferguson Machine Company S.A., Brussels, Belgium, 11-23-84.
Drawing No. 10.3.00 of CHS. Richiger AG, Steffisburg, Switzerland, 11-28-86.

Primary Examiner—Allan D. Herrmann
Attorney, Agent, or Firm—McCormick, Paulding & Huber

[57] ABSTRACT

An intermittent or stepping drive has a first rotatable member (20), which is driven by a driving shaft (12), in engaging relationship with a second rotatable member (30) from which a driven shaft (22) is driven whereby a continuous rotation of the first rotatable member (20) is converted into an intermittent rotation of the second rotatable member (30). One of the two rotatable members (20,30) is connected to the associated shaft (12,22) by a clutch (40) which is associated with a retaining member (50) that exerts thereon a retaining force (E) acting in an engagement sense. One of the shafts (12,22) is associated with a control device (60) which controls the retaining force (E) depending upon the angular position of rotation of the shaft. The control is suitable for the actual applications of the stepping drive of the type in which the clutch in each drive phase transmits a moment that is just as large as the sum of the acceleration moment, the useful moment and the friction moment, which occur in the respective driving phases when the drive is not disturbed. If this sum should be exceeded by a disturbing moment, the clutch permits a relative rotation of the rotatable member in question with respect to the associated shaft as well as when the disturbing moment is small in relation to said sum of the moments.

11 Claims, 6 Drawing Sheets

STEPPING DRIVE

The invention relates to a stepping drive having a first rotary member which can be driven by a driving shaft, a second rotary member whereby a driven shaft can be driven, and an engagement relationship between the two rotary members through which a continuous rotation of the first rotary member can be converted into an intermittent rotation of the second rotary member.

Such intermittent rotations of the kind produced by the present invention are necessary—either in the form of rotations advancing step-by-step in a specific direction of rotation or in the form of reciprocating rotations—for numerous processing and conveying operations. For example, a drive of the said type may drive a conveyor which moves rounded can body blanks through between electrode rollers whereby longitudinal edges of the can body blanks are welded together.

In order that the conveyor may be able to take over reliably a rounded can body blank from a preceding rounding apparatus on each working cycle, the conveyor must be periodically slowed down or stopped altogether. On the other hand, however, the conveyor should move each individual can body blank through between the electrode rollers at as constant a speed as possible in order that a uniform welding seam may result.

During such conveying movements, which are derived from a stepping drive, inert masses which may be of considerable size in some circumstances have to be periodically accelerated and decelerated. The stepping drive must therefore be capable of delivering correspondingly great torques in alternating directions in addition to a useful torque corresponding to the actual conveying task. To this, torques for compensating for friction losses and the like generally also have to be added.

In a known stepping drive of the type described at the beginning (Catalogue No. 7/82 of the Ferguson Machine Company S.A., Brussels, Belgium) the driving and the driven shaft are mounted at right angles to one another in a drive casing. The first rotary member has a helical rib which extends over somewhat more than one revolution and has a starting region, a middle region and an end region without pitch, and intermediate regions with a pitch increasing and then decreasing again for example sinusoidally. This first rotary member is rigidly secured to the driving shaft. The second rotary member is rigidly secured to the driven shaft and has radial pins which are arranged in the form of a star and on each of which there is mounted a roller.

During each revolution of the first rotary member, the helical rib moves through between two rollers on the second rotary member and intermittently contacts a third roller with its starting and end regions so that there is always positive engagement between the two rotary members. As a result, the second rotary member is forced, during each complete revolution of the first rotary member, to turn through an angle which corresponds to the spacing between each two adjacent rollers.

Stepping drives of the said type are also known with parallel shafts, for example Geneva motions.

If a known stepping drive or a following device is to be protected from overloading, an overload clutch can be disposed between the driven shaft of the stepping drive and the following device. Known slipping clutches are suitable for this, for example. The transmissible torque of such a clutch must be adjustable in such a manner that the clutch is capable of transmitting the sum of all the moments normally occurring in operation, namely accelerating or decelerating moments, friction torques and useful moments. The sum of these moments may be very great in relation to a disturbing moment which can occur as a result of a disturbance in operation at the following device. For this reason alone, it is difficult to adjust a known clutch, which may be disposed between a known stepping drive of the said type and a following device, in such a manner that it reacts at all to a disturbing moment.

To this must be added the fact that a disturbance at a following device may occur in an operational phase in which significant inert masses are being moved at a uniform speed so that accelerating moments do not occur. In the event of such a disturbance, the sum of the disturbing moment and any additional useful and friction moments which may occur may be considerably less than the maximum accelerating moment occurring in other operational phases. Therefore, there is the danger that an overload clutch of known type may not react to a disturbing moment before the disturbance at the following device has assumed proportions at which the disturbing moment is greater than the greatest sum of accelerating, useful and friction moments occurring in normal operation. As a result, known stepping drives of the type in question and/or following devices may be damaged.

It is therefore the object of the invention to develop a stepping drive further in such a manner that it is capable or reacting to disturbing moments in good time regardless of the phase of an operating cycle in which a disturbance occurs.

SUMMARY OF THE INVENTION

According to the invention, the problem is solved in a stepping drive of the type described at the beginning in that one of the two rotary members is connected to the associated shaft by a clutch, associated with the clutch is a retaining member which exerts a retaining force thereon, acting in the engaging sense and associated with one of the shafts is a control device which controls the retaining force independently of the angular position of rotation of this shaft.

The control according to the invention can be adapted in its formation and arrangement to the particular application of the stepping drive in such a manner that, in each operational phase, the clutch transmits a torque which is just as great as the sum of the accelerating, useful and friction torques which occur in the operational phase in question when operation is undisturbed. If this sum is exceeded by a disturbing moment, the clutch permits a relative rotation of the rotary member in question with respect to the associated shaft even if the disturbing moment is small in proportion to the said sum of the moments. Thus both a following device and the stepping drive according to the invention can be effectively protected.

In an appropriate development of the invention, the control device comprises at least one one cam which rotates with one of the two shafts and acts, through a cam follower member, on a spring which leads the retaining member.

In this case, it is an advantage if a displacement converter with an adjustable conversion ratio is disposed between the cam follower member and the retaining member.

The displacement converter may, for example, comprise two levers which are connected to one another by a joint which is adjustable along the two levers.

The control device is preferably associated with the driving shaft. This has the advantage that the control device can vary the torque which can be transmitted by the clutch even in those operational phases in which the second rotary member and hence also the driven shaft is at a standstill.

It is further an advantage if the clutch is disposed between the second rotary member and the driven shaft. Fundamentally, however, the clutch can also fulfill its protective function even if it is disposed between the first rotary member and the driving shaft.

The clutch is preferably disposed inside a drive casing between two bearings of the driven shaft. These bearings must generally in any case be so designed that they can transmit considerable axial forces; it is then not necessary to provide for the clutch additional bearings which conduct axial forces into the casings.

In suitable cases, the clutch may be a slipping or trip clutch of a known type of construction. It is a particular advantage, however, if the clutch is a shifting clutch which generates a disengaging force depending on the torque at the shaft in question and disengages completely when a specific torque is exceeded by the retaining force. Such shifting clutches are also known per s.

Finally, it is an advantage if a disengaging device which can be actuated by hand is additionally associated with the clutch.

BRIEF DESCRIPTION OF THE DRAWINGS

One example of embodiment of the invention is explained with further details below with reference to diagrammatic drawings.

DESCRIPTION OF THE PREFERRED EMBODIMENTS

Figure 1:
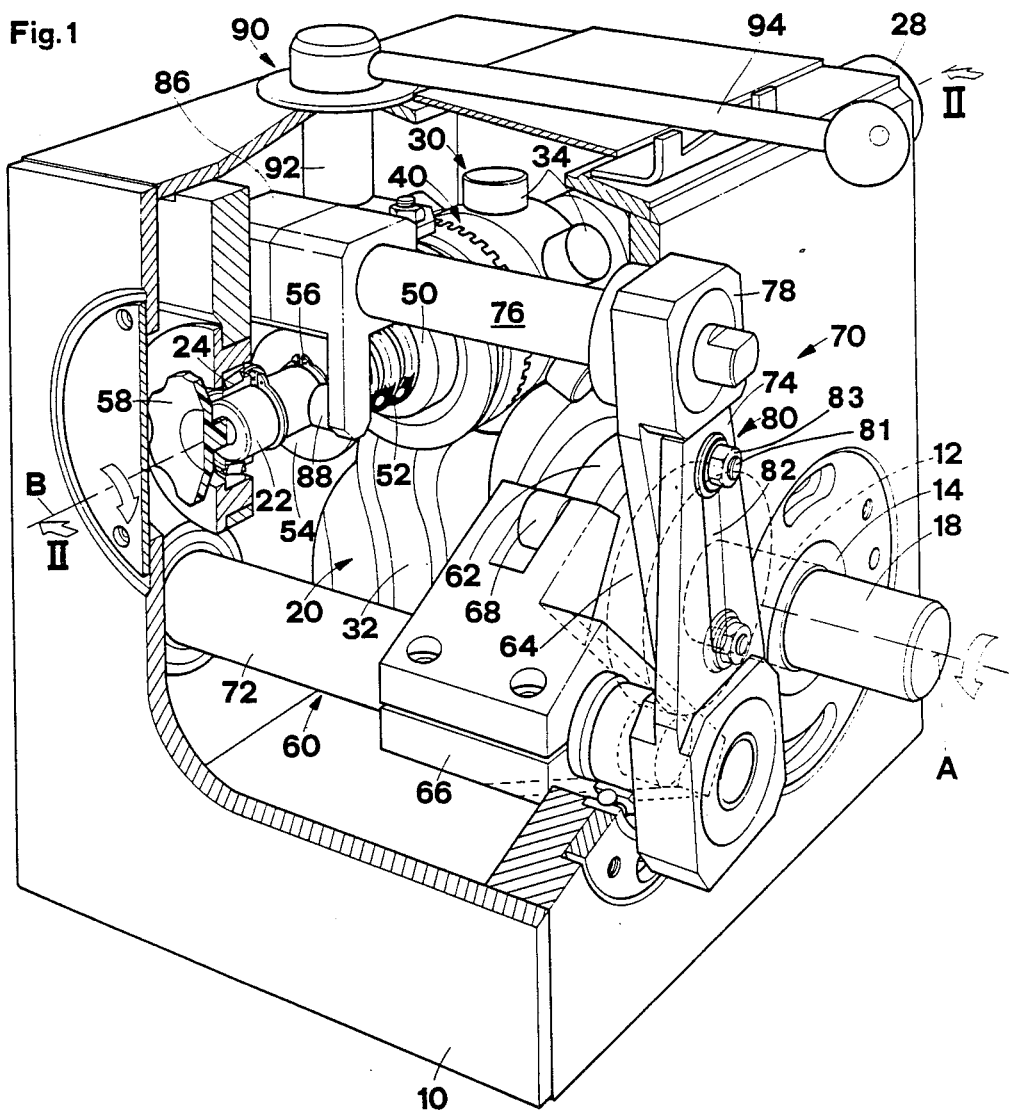
FIG. 1 shows an oblique view of a stepping drive according to the invention which is illustrated partially cut away.
Figure 2:
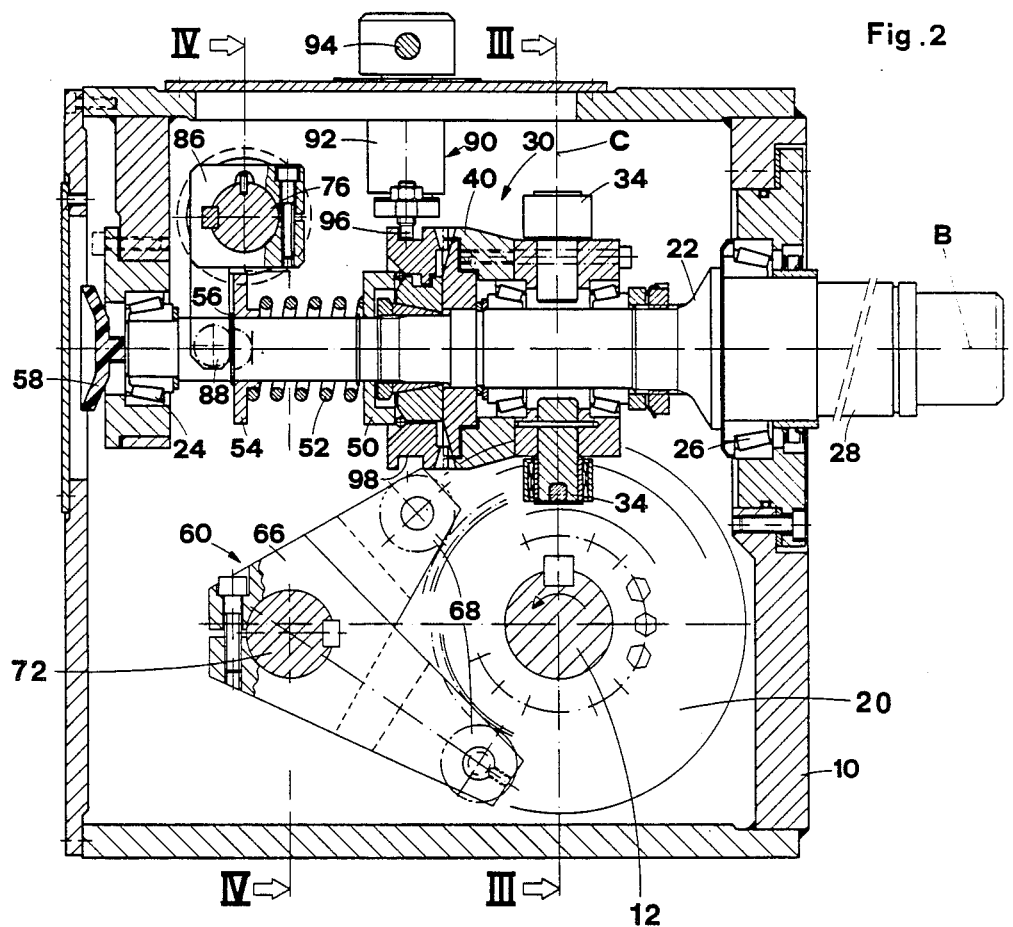
FIG. 2 shows the section on II—II in FIG. 1.
Figure 3:
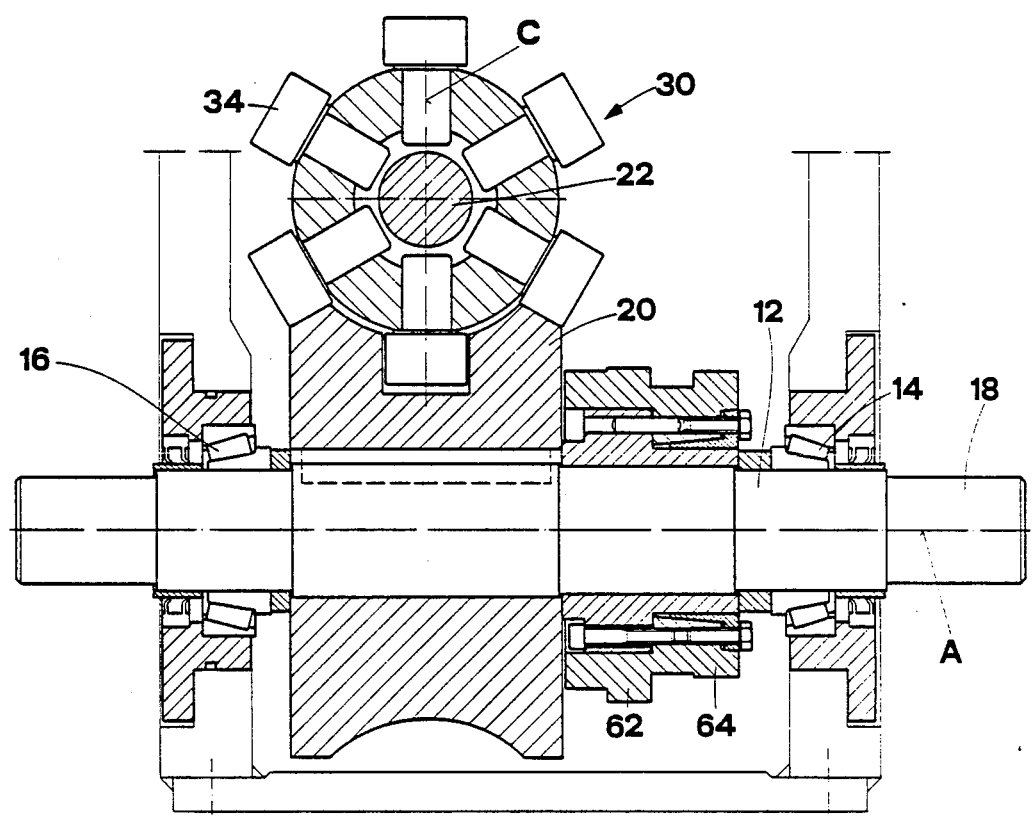
FIG. 3 shows the section on III—III in FIG. 2.
Figure 4:
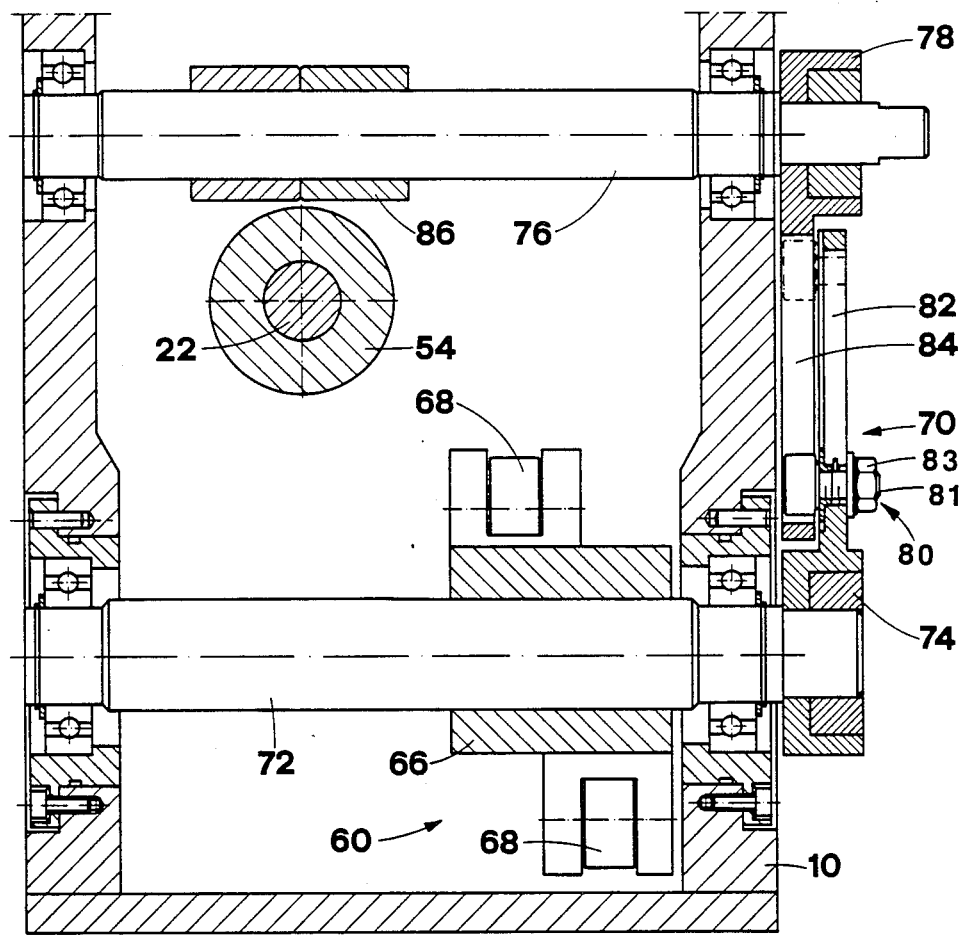
FIG. 4 shows the section on IV—IV in FIG. 2.

The stepping drive illustrated has a drive casing 10 in which a driving shaft 12 is mounted in two bearings 14 and 16. Inside the drive casing 10, a first rotary member 20 is secured to the driving shaft 12. The driving shaft 12 has a journal 18 which projects out of the drive casing 10 and can be coupled, in the usual manner, to a motor which drives the driving shaft continuously.

A driven shaft 22 is mounted in two bearings 24 and 26 in the drive casing 10 with spacing above the driving shaft 12 and at right-angles to this. The driven shaft 22 has a journal 28 which projects out of the drive casing 10 and can be connected to a following device of any type. A second rotary member 30 is mounted on the driven shaft 22 inside the drive casing 10.

The first rotary member 20 is a roller of hardened steel with a helical rib 32 which extends over somewhat more than one complete revolution, for example over an angular range of 400° and has regions with different pitches. The geometrical axis A of the driving shaft 12 coincides with that of the first rotary member 20.

The second rotary member 30 has rollers 34 which are disposed with uniform angular spacing all around the geometrical axis B of the driven shaft 22 and each of which can be rotated about a radial axis C. In every operational phase of the drive, the helical rib 32 extends without clearance between two adjacent rollers 34 and intermittently touches a third roller.

Although the second rotary member 30, as such, is mounted for rotation on the driven shaft 22, nevertheless it is coupled thereto in operation. For this purpose, a tubular outer clutch member 36 on which face teeth 37 are formed in a ring is secured to the second rotary member 30 while a hub-like inner clutch member 38 on which face teeth 39 are formed is non-rotatably secured to the driven shaft 22. The two clutch members 36 and 38 belong to a shifting clutch 40 in accordance with drawing No. 10.3.00 of Chs. Richiger AG, Steffisburg, Switzerland. The clutch 40 has a sliding sleeve 42 which comprises face teeth 41 which can be brought simultaneously into engagement with both sets of face teeth 37 and 39.

Figure 5:
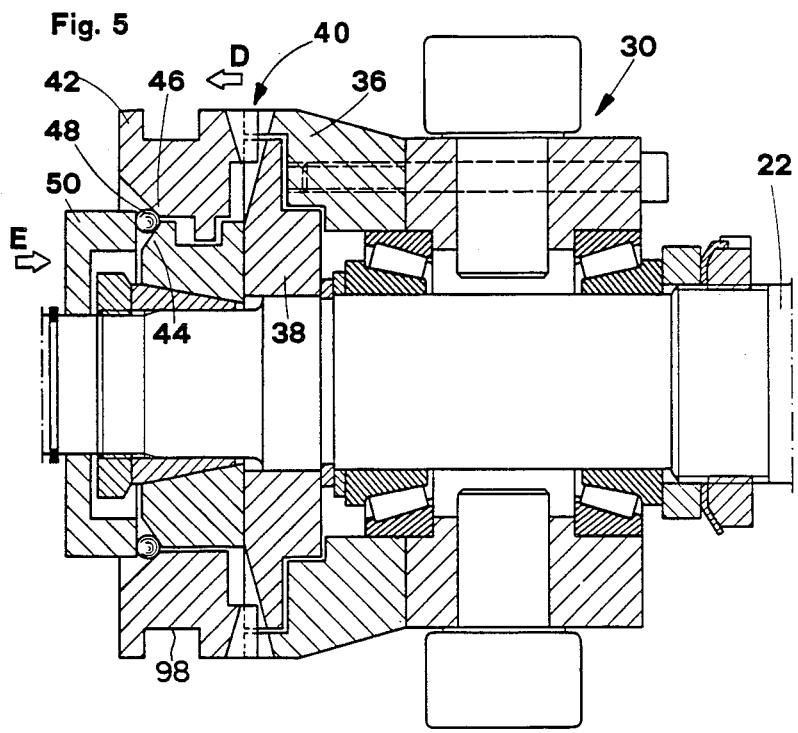
FIG. 5 shows details of FIG. 2 in the operating position and FIG. 6 shows details of FIG. 2 in the disengaged position.
Figure 6:
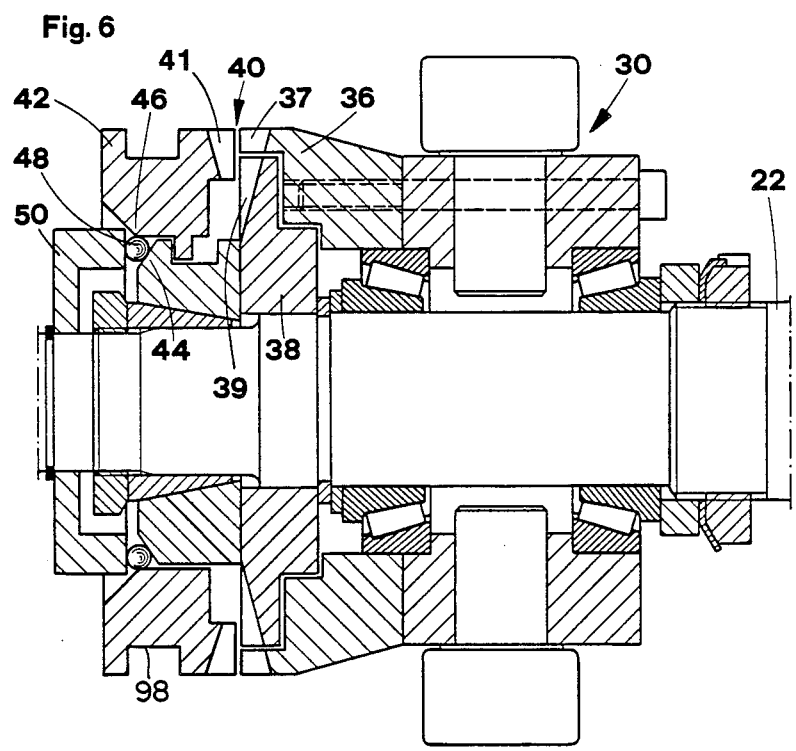

The clutch 40 is illustrated engaged in FIG. 5 and disengaged in FIG. 6. In the engaged state, torques can be transmitted from the inner clutch member 38 via the sliding sleeve 42 to the outer clutch member 36 and likewise in the reverse direction.

Figure 7:
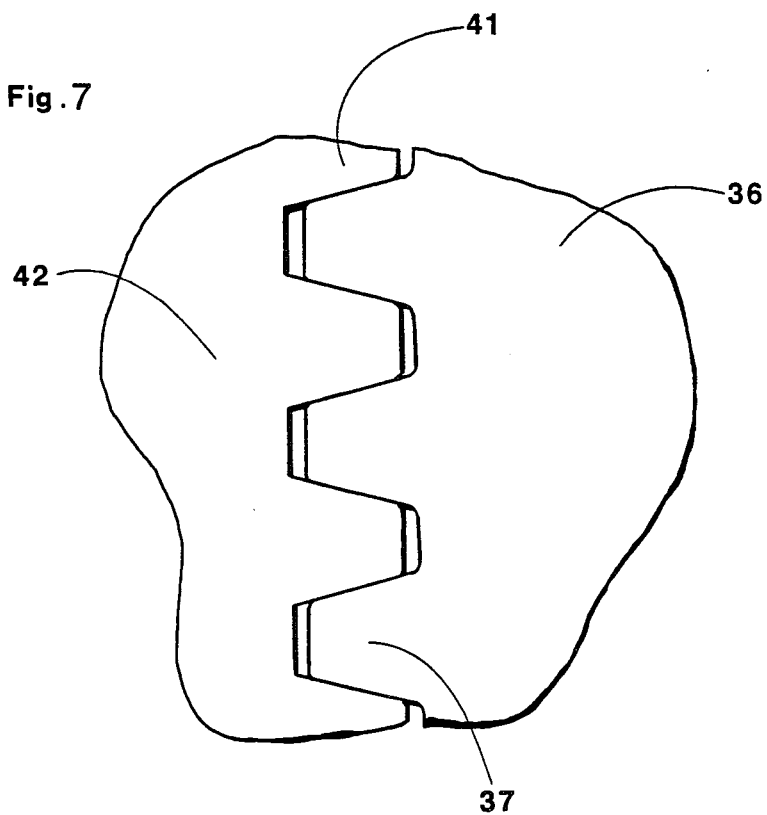
FIG. 7 is a fragmentary plan view from above in FIG. 1 and shows the oblique flanks of the engaged teeth of the clutch.

The face teeth 37 are of a type also known by the name of Hirth-type teeth and have such oblique flanks as shown in FIG. 7 that they generate a disengaging force D in the direction of the axis B in FIG. 5, which force is directly proportional to the torque loading of the shifting clutch. A retaining force E counteracts the disengaging force D.

The conical end of the inner clutch member 44 and the conical recess 46 situated opposite one another are formed on the clutch member 38 and on the sliding sleeve 42 and balls 48 are held resting between the conical end and the conical recess by an annular retaining member 50 under the pressure of a spring 52. The spring 52 is disposed between the retaining member 50 and an annular disc 54 and like this is axially displaceable on the driven shaft 22.

The displaceability of the annular disc 54 away from the clutch 40 is limited by a guard ring 56 on the driven shaft 22 in such a manner that the spring 52 is held under initial loading when the annular disc 54 is bearing against the guard ring 56.

This initial loading determine the minimum possible magnitude of the retaining force E.

Secured to the driven shaft 22, outside its bearing 24, is a hand wheel 58 by which it can be turned, with the clutch 40 disengaged, in such a manner that, on engagement of the clutch, it assumes a predetermined angular position in relation to the second rotary member 30. This angular position can be recognised by scale graduation marks which are visible, for example through an inspection glass in a wall of the drive casing 10.

The retaining force E can be increased beyond the minimum amount determined by the initial loading of the spring 52 in that the annular disc 54 is adjusted towards the second rotary member 30 in the direction of the axis B. A control device 60, which is dependent on the driving shaft 12, serves this purpose.

The control device 60 includes two camplates which are designated simply as cams 62 and 64 hereinafter. These cams 62 and 64 are secured to the driving shaft 12 for rotary adjustment and cooperate with a common cam follower member 66.

This has the form of a bell-crank lever with two rollers 68, each of which rolls without play on one of the cams 62 and 64.

All the movements of the cam follower member 66 caused by the cams 62 and 64 are converted by a displacement converter 70 with an adjustable conversion ratio into movements of the annular disc 54 and hence into corresponding variations in the retaining force E.

The displacement converter 70 includes a shaft 72 which is mounted in the drive casing 10 parallel to the axis A and carries the cam follower member 66 as well as a lower level 74 disposed outside the drive housing, as well as a shaft 76 which is mounted further up likewise parallel to the axis A and to which an upper lever 78 is secured, likewise outside the drive casing 10. The two levers 74 and 78 are connected to one another by means of a joint 80 in the form of a bolt 81 which is clamped by a nut 83 in a slot 82 of the lever 74 and which has a head engaging a slot 84 of the lever 78.

The transmission ratio of the displacement converter 70 can be varied, for example in the range 1:3 to 3:1, by adjusting the joint 80 in the slots 82 and 84. A forked adjusting member 86 is secured to the upper shaft 76 inside the drive casing 10 and presses against the annular disc 54 with a pair of rollers 88 mounted on it.

Thus the retaining force E, which tends to hold the clutch 40 engaged, can be varied in synchronism with the rotary movement of the driving shaft 12 and, during each complete revolution of this shaft, may have one or more relative maxima and a corresponding number of relative minima none of which is less than the initial tensioning of the spring 52 which is determined by the annular disc 54 bearing against the guard ring 56.

If the clutch 40 is loaded by a torque, the disengaging force D from which resulting at the face teeth 37, 39 and 41 reaches the retaining force E simultaneously available, the clutch members 36 and 38 turn slightly in relation to one another and in relation to the sliding sleeve 42. The balls 48, which hitherto were held between the retaining member 50 on the one hand and the conical end 44 and the conical recess 46 on the other hand, as shown in FIG. 5, now find room between the conical end 44 of the clutch member 38 as a result of the relative turning of the clutch member 38 in relation to the sliding sleeve 42 so that they travel radially inwards and release the conical recess 46 of the sliding sleeve 42.

The retaining force E now only continues to act on the dogs 44 of the clutch member 38 through the annular retaining member 50 and the balls 48. Consequently, the sliding sleeve 42, unhindered by the retaining force E, is displaced in the direction of the disengaging force D so that its face teeth 41 disengage from the face teeth 37 of the clutch member 36 as well as from the face teeth 39 of clutch member 38.

As a result, the power transmission path between the inner and outer clutch members 36 and 38 is interrupted so that the driven shaft 22 is freely rotatable.

In case the clutch 40 is to be deliberately disengaged, a disengaging device 90 is provided which can be actuated by hand. This includes a vertical shaft 92 which is mounted in the drive housing 10 and on which a hand lever 94 is disposed externally and an eccentric pin 96 internally. The eccentric pin 96 engages in an annular groove 98 in the sliding sleeve 42.

We claim:

1. A stepping drive having a first rotary member which can be driven by a driving shaft, a second rotary member by which a driven shaft can be driven, the two rotary members being in an engaged relationship whereby a continuous rotation of the first rotary member can be converted to an intermittent rotation of the second rotary member, characterized in that
    one of the two rotary members is connected to the associated shaft by a clutch,
    associated with the clutch is a retaining member which exerts a retaining force acting in the engagement sense thereon, and
    associated with one of the shafts is a control device operatively connected with the retaining member and controlling the retaining force as a function of the angular position of rotation of said one of the shafts.

2. A stepping drive according to claim 1, characterised in that the control device comprises at least one cam which rotates with said one of the two shafts and a cam follower actuated by the cam, the control device further including a spring connected with the retaining member and operated by the cam follower to thereby load the retaining member.

3. A stepping drive according to claim 2, characterized in that a displacement converter with an adjustable transmission ratio is disposed between the cam follower member and the retaining member.

4. A stepping drive according to claim 3, characterized in that the displacement converter comprises two levers which are connected to one another by a joint which is adjustable along the two levers.

5. A stepping drive according to claim 1, characterized in that the control device is associated with the driving shaft.

6. A stepping drive according to claim 1, characterized in that the clutch is disposed between the second rotary member and the driven shaft.

7. A stepping drive according to claim 1, characterized in that the clutch is disposed inside a drive casing in a gap between two bearings of the driven shaft.

8. A stepping drive according to claim 1, characterized in that the clutch is a shifting or trip clutch which generates a disengaging force depending on the torque on the shaft in question and disengages completely when a torque determined by the retaining force is exceeded.

9. A stepping drive according to claim 1, characterized in that a disengaging device which can be actuated by hand is additionally associated with the clutch.

10. A stepping drive having a first rotary member which is driven by a driving shaft, a second rotary member by which a driven shaft is driven, the two rotary members being in an engaged relationship whereby a continuous rotation of the first rotary member is converted into an intermittent rotation of the second rotary member, characterized in that
    one of the two rotary members is connected to the associated shaft by a clutch;
    associated with the clutch is a retaining member which exerts a retaining force acting in the engagement sense on the clutch;

associated with one of the shafts is a control device operatively connected with the retaining member and controlling the retaining force as a function of the angular position of rotation of said one of the shafts, said control device including at least one cam rotating with said one of the two shafts and a cam follower actuated by the cam, the control device further including a spring connected with the retaining member and operated by the cam follower to thereby load the retaining member, and a displacement converter dispose between the cam follower member and the retaining member, said displacement converter having an adjustable transmission ratio.

11. A stepping drive according to claim 10 wherein said displacement converter comprises two levers connected to one another by a joint, said joint being adjustable along the two levers.

* * * * *